United States Patent [19]

Koga

[11] Patent Number: 4,983,116
[45] Date of Patent: Jan. 8, 1991

[54] SECONDARY INJECTION MOLDING MACHINE FOR HOLLOW MOLDED PRODUCTS

[75] Inventor: Kouhei Koga, Komoro, Japan
[73] Assignee: Nissei ASB Machine Co., Ltd., Japan
[21] Appl. No.: 391,572
[22] PCT Filed: Nov. 25, 1988
[86] PCT No.: PCT/JP88/01195
§ 371 Date: Jul. 25, 1988
§ 102(e) Date: Jul. 25, 1988
[87] PCT Pub. No.: WO89/04752
PCT Pub. Date: Jun. 1, 1989

[30] Foreign Application Priority Data
Nov. 25, 1987 [JP] Japan .................. 62-296411
[51] Int. Cl.$^5$ .................................. B29C 49/20
[52] U.S. Cl. ........................ 425/517; 425/525; 425/577
[58] Field of Search ............ 425/517, 525, 576, 577, 425/542; 264/513, 516, 531, 534, 328.5, 328.11

[56] References Cited

U.S. PATENT DOCUMENTS

| | | | |
|---|---|---|---|
| 3,441,982 | 5/1969 | Sagara et al. | 425/525 |
| 4,038,006 | 7/1977 | Farrell | 425/525 |
| 4,123,217 | 10/1978 | Fischer et al. | 425/525 |
| 4,133,622 | 1/1979 | Braun | 264/328.11 X |
| 4,299,371 | 11/1981 | Duga | 425/525 X |
| 4,303,381 | 12/1981 | Aoki | 425/525 X |
| 4,727,997 | 3/1988 | Nakamura et al. | 215/100 A |

FOREIGN PATENT DOCUMENTS

| | | |
|---|---|---|
| 64948 | 6/1981 | Japan . |
| 194520 | 11/1983 | Japan .................. 425/525 |
| 127928 | 8/1987 | Japan . |
| 62-181130 | 8/1987 | Japan . |
| 182044 | 8/1987 | Japan . |

*Primary Examiner*—Richard L. Chiesa
*Attorney, Agent, or Firm*—Ostrolenk, Faber, Gerb & Soffen

[57] ABSTRACT

This invention relates to a secondary molding machine capable of injection molding a handle, a base cup, or the like on a body portion, a bottom portion or the like of a thin-wall hollow container made of synthetic resin. The machine includes a rotational member provided movably up and down on a column on a machine bed, an insert mechanism including a lateral molded-product holding device mounted on the rotational member, a clamping mechanism for connecting an upper clamping plate, which is moved up and down for opening and closing the mold cavities to the rotational member, a secondary mold that is opened and closed up and down having the same first cavity as a hollow molded product and a secondary molding cavity. An air blowing device is connected to a blow core.

7 Claims, 4 Drawing Sheets

SECONDARY INJECTION MOLDING MACHINE FOR HOLLOW MOLDED PRODUCTS

FIELD OF THE ART

This invention relates to a molding machine which can secondarily injection-mold a handle, a base cup and the like on a synthetic resin hollow product such as a blow-molded bottle.

BACKGROUND

An injection blow molding machine capable of primarily injection molding a base cup on a bottom of a thin-wall synthetic resin container oriented blow molded has been already known from Japanese patent application Laid-Open Publication No. 58-194520.

The above molding machine is designed so that a hollow molded product such as a bottle oriented blow molded is moved, without being removed from a transfer plate, to a secondary molding mold provided adjacent to a blow molding mold, and an internal pressure is applied under the attitude of the product oriented blow molded to inject a base cup.

A secondary molding of a handle to a hollow molded product oriented blow molded is disclosed in Japanese patent application Laid-Open Publication No. 62-181130. Also in this molding method, an internal pressure is applied to a hollow molded product to injection mold a handle on a thin-wall body portion but this application discloses no apparatus required for molding.

It is convenient to carry out the secondary molding of a handle or the like while holding a hollow molded product on the side of a transfer plate as in the above-described molding machine in terms of supplying a hollow molded product to a secondary molding mold. A relative position between a hollow molded product as a member to be molded and a secondary molding mold can be easily coincided. In this case, however, a series of operations comprising injection molding of a parison, orientation blow molding of a hollow molded product and secondary molding are continuously carried out. Therefore, this system can be employed for a molding method generally called a hot parison system but cannot be employed for a cold parison system in which a molded parison is orientation blow molded later by other apparatus.

Problems encountered in the case where a handle or the like is injection molded to a hollow molded product after removal from an orientation blow molding machine lie an insert of a hollow molded product into a mold, and a connection between an air blowing device for applying an internal pressure and a hollow molded product. It is therefore desirable to develop a secondary injection molding machine which is easy for insertion, which can positively provide a connection between a hollow molded product within the mold and a blow core, and which can supply an internal pressure enough to withstand an injection pressure into a hollow molded product.

DISCLOSURE OF THE INVENTION

Accordingly, this invention has been achieved in view of the aforementioned circumstances. An object of this invention is to provide a secondary injection molding machine for inserting a hollow molded product such as a bottle made of synthetic resin into a secondary molding mold to secondarily injection mold a handle on a body portion or a base cup or the like on a bottom portion thereof, in which the insertion of a hollow molded product into a secondary molding mold can be smoothly done and pressing of a hollow molded product within the mold by air pressure can be positively carried out.

For achieving the aforesaid object, this invention provides a secondary injection molding machine comprising a rotational member provided movably up and down on a column on the machine bed, an insert mechanism comprising a lateral molded-product holding device mounted on the rotational member, a vertical clamping mechanism positioned adjacent to the insert mechanism and having an upper clamping plate which is vertically moved for opening and closing a mold connected to the rotational member, a secondary molding mold mounted on the clamping mechanism so that the secondary molding mold is opened and closed up and down, an injection device on the machine bed disposed horizontally with respect to the clamping mechanism, and an air blowing device positioned on the side of the column and connected to the blow core at a descended position.

The above-described secondary molding mold has the same cavity as a premolded hollow molded product and a secondary molding cavity, and the above-described molded-product holding device bas a chuck holding an opening and a blow core having a fore end which extends through the chuck positioned within the opening, whereby a mouth portion of a hollow molded product is held and fixed, and an internal pressure of air pressure is applied thereto to render possible injection molding of secondarily molded parts such as a handle and the like in position as required.

With the above-described structure, a hollow molded product is laterally held by the holding device of the insert mechanism, at the position opposite to the clamping mechanism. The insert mechanism rotatably moves a hollow molded product as well as a holding device to the secondary molding mold in an opened state. When the insert mechanism stops, closing starts and the upper clamping plate moves down. Since the upper clamping plate and the rotational member of the insert mechanism are connected, the insert mechanism is moved down simultaneously and insertion of a hollow molded product into the secondary molding mold is carried out.

When clamping is completed, the air blowing device is connected to the blow core through which the chuck of the holding device extends, and air is pressed into the hollow molded product to apply an internal pressure thereto. Thereafter, a molten resin is injected and filled in the secondary molding cavity within the mold to mold a secondary molded part on the body portion or bottom portion of the hollow molded product.

Accordingly, a hollow molded product is not deformed due to an injection pressure. In closing, a hollow molded product is also moved up and down owing to upward and downward motion resulting from the connection between the insert mechanism and the upper clamping plate to effect insertion of release, whereby even at the time of transfer caused by rotation, it is possible to accurately perform a positioning of a hollow molded product with respect to a mold.

BRIEF DESCRIPTION OF THE DRAWINGS

The drawings schematically show one embodiment of a secondary injection molding machine for a hollow molded product according to this invention.

BEST MODE FOR CARRYING OUT THE INVENTION

Figure 1:
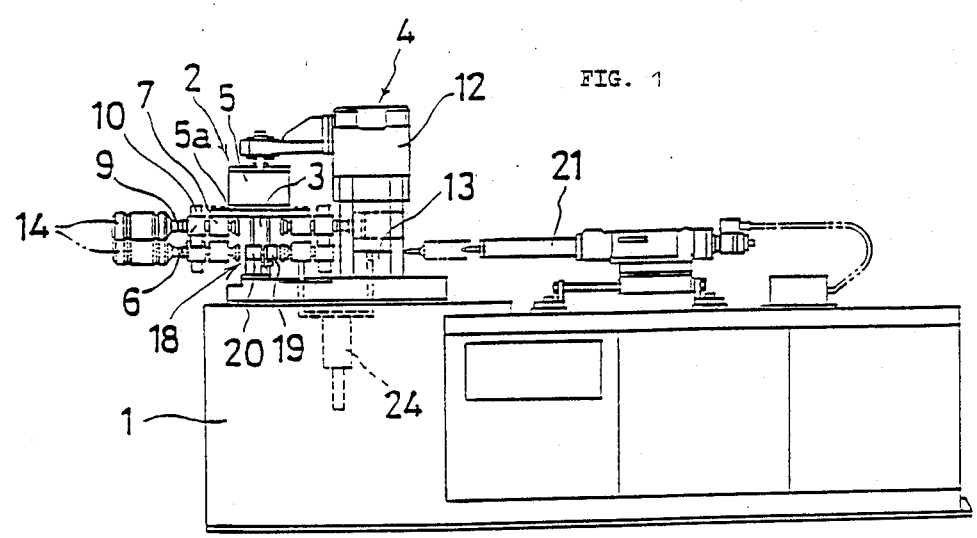
FIG. 1 is a front view.
Figure 2:
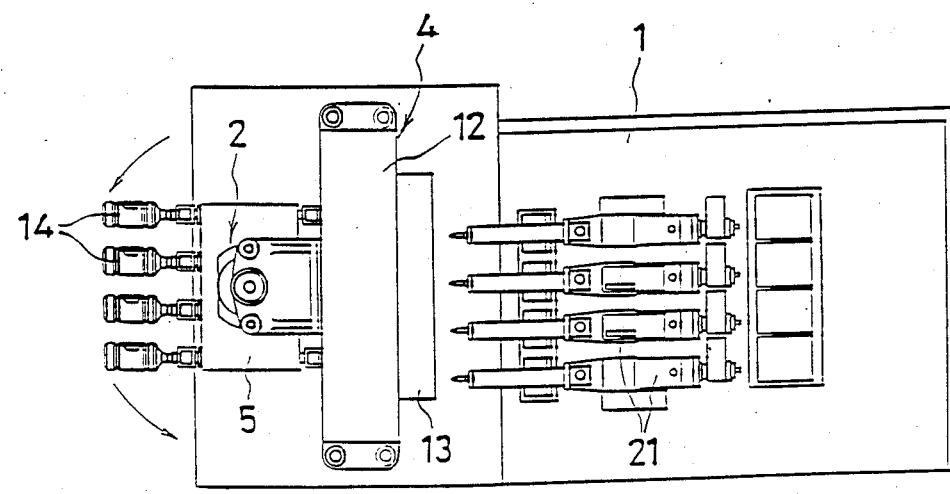
FIG. 2 is a plan view.

The molding machine shown in the drawings is a molding machine for secondarily molding a handle on a body portion of a thin-wall bottle orientation-blow molded. Adjacent to a machine bed 1, a column 3 of an insert mechanism 2 and a vertical clamping mechanism 4 are provided.

The insert mechanism 2 is composed of a rotational member 5 provided on the column 3 rotatably and movable up and down by use of a bearing, a spline shaft or the like and a lateral holding device 6 mounted on the underside of the rotational member 5.

Figure 3:
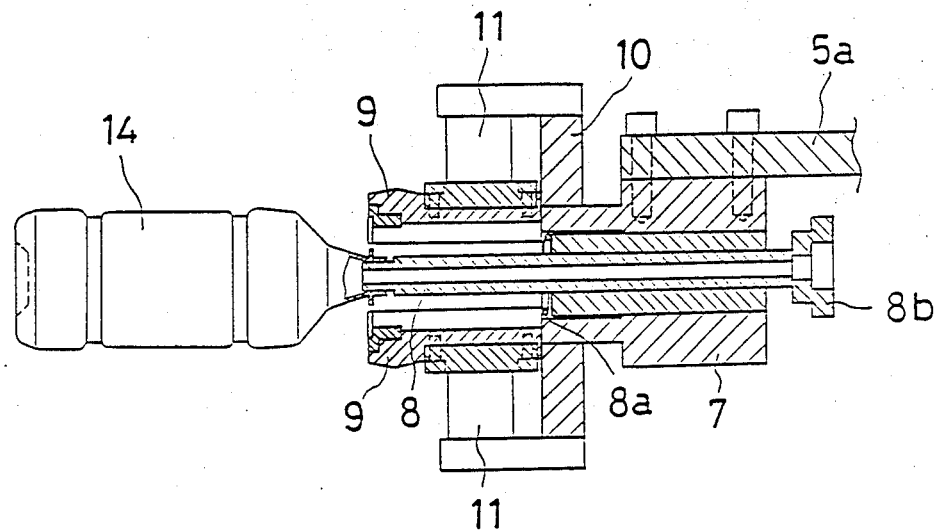
FIGS. 3 and 4 are respectively sectional views showing the holding of a hollow molded product.
Figure 4:
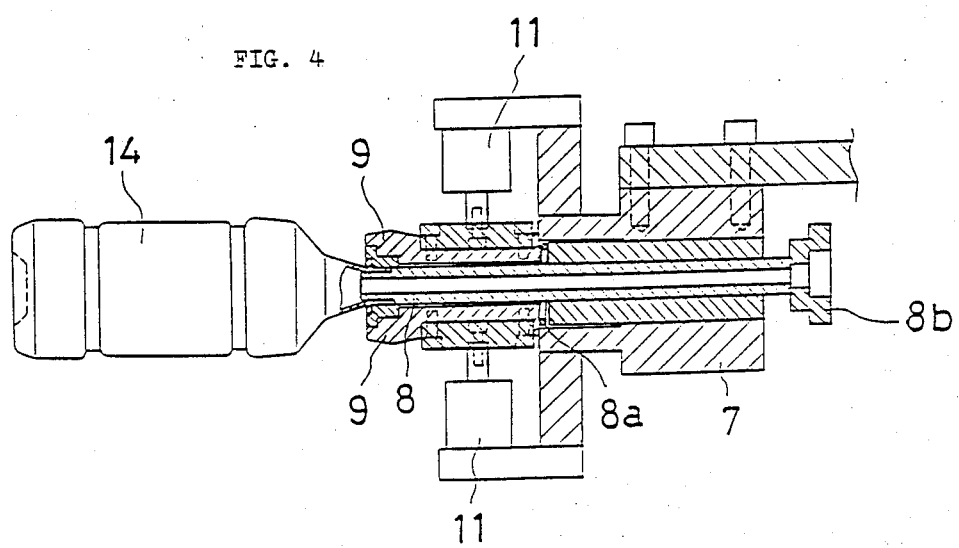

The holding device 6, details of which are shown in FIGS. 3 and 4, is composed of a holding body 7 affixed to a lower edge 5a of the rotational member 5, a blow core 8 extended into the holding body 7, a chuck 9 that may be opened up and down provided in the periphery of the fore end of the blow core 8, and an opening and closing cylinder 11 of the chuck mounted on a holder 10. A spring 8a is inserted between the chuck 9 and a core shoulder.

The clamping mechanism 4 is of the vertical type in which an upper clamping plate 12 is positioned on the machine bed, and a lower clamping plate and a clamping cylinder are positioned within the machine bed though not shown, the upper clamping plate 12 being moved up and down together with a tie bar to effect opening and closing.

The upper clamping plate 12 of the clamping mechanism 4 and the rotational member 5 of the insert mechanism 2 are connected with each other so that the insert mechanism 2 is moved up and down together with the upper clamping plate 12.

Figure 5:
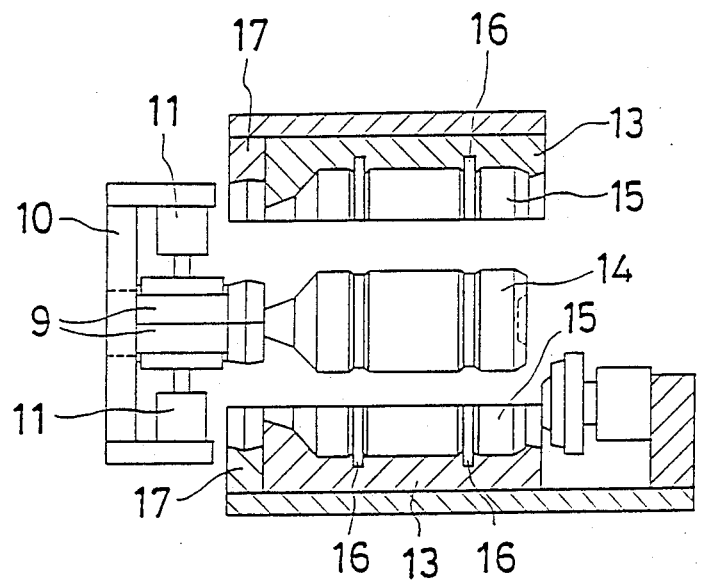
FIGS. 5 and 6 are respectively sectional views showing the insertion state.

On the upper clamping plate 12 and a lower clamping plate (not shown), a divisional secondary molding mold 13 shown in FIG. 5 and thereafter is mounted. This mold is provided with a cavity 15 having the same shape as a premolded bottle 14 made of synthetic resin and a secondary molding cavity 16 for molding a handle, and further provided with a fastening portion 17 of the chuck 9.

An air blowing device indicated at 18 is mounted on the machine bed on the side of the column 3. When the holding device 6 is moved down and a plug 19 provided directed at the clamping mechanism is pushed out by a cylinder 20, the air blowing device 18 comes into contact with a rear end 8b of the blow core 8 and urges the blow core 8 against the spring 8a.

The operation of the machine will be described hereinafter.

An opening of the bottle 14 is fitted into the fore end of the blow core 8, as shown in FIG. 3, after which the chuck 9 is closed to hold the mouth portion of the bottle to hold the bottle 14 horizontally as shown in FIG. 4.

Figure 6:
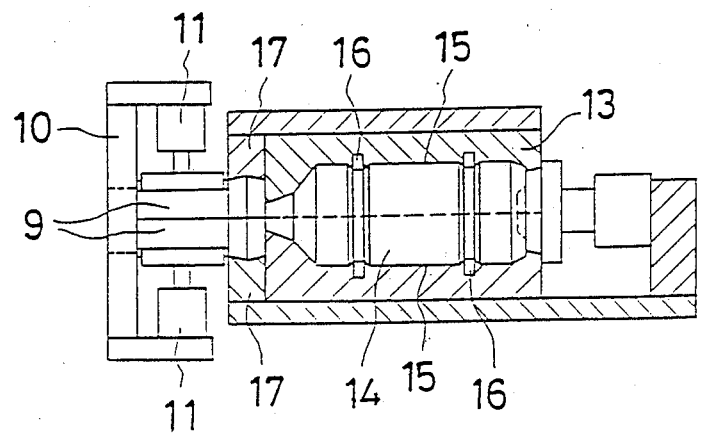
Figure 7:
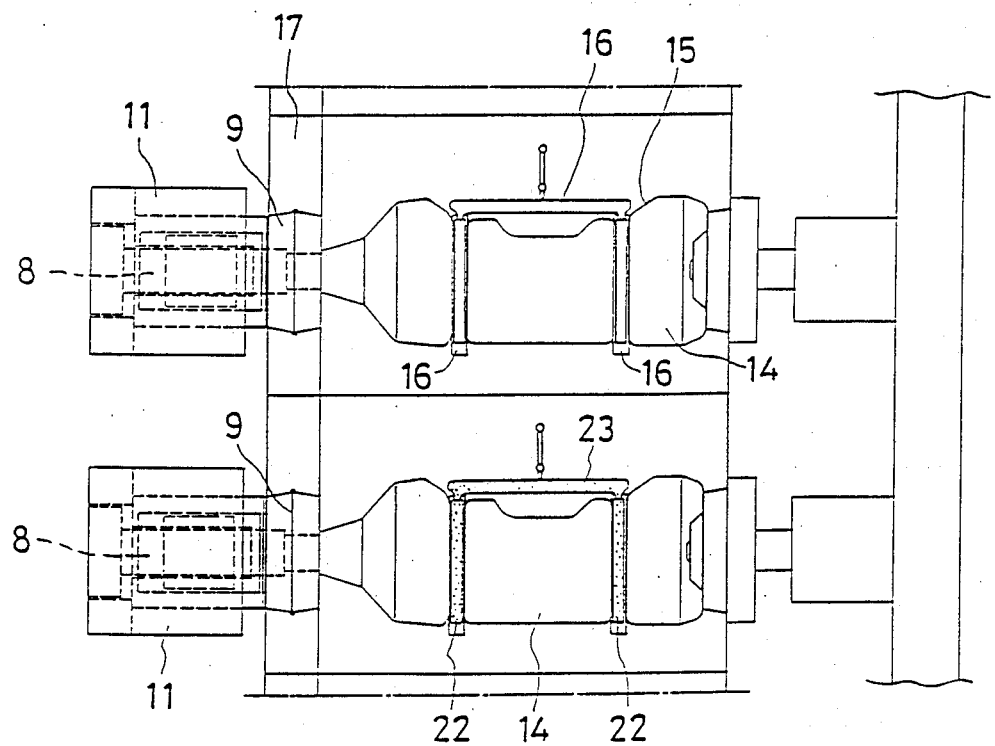
FIG. 7 is a plan view of a mold showing the state before and after the secondary molding.

Then, the insert mechanism 2 is rotated counterclockwise through 180 degrees by the rotational member 5 to move the bottle 14 to the opened secondary molding mold 13 (see FIG. 5). After stop and when the clamping mechanism 4 is actuated to move the upper clamping plate 12 downwardly and to shift the mode to the closing step, the insert mechanism 2 is also moved down and the bottle 14 positioned in the mold is also moved downward. Closing as shown in FIG. 6 is carried out.

When clamping further takes place, the chuck portion is held down by the fastening portion 17 so as to withstand internal pressure. Thereafter, the plug 19 of the air blowing device 18 is placed in pressure contact with the rear end of the blow core 8, and air pressure of approximately 30 kg/cm$^2$ is applied into the bottle through the blow core 8. After pressing, a secondary molding material is injected into the secondary molding mold 13 from the injection device 21 on the machine bed 1 disposed horizontally with respect to the clamping mechanism and a handle 23 integral with a band 22 surrounding the secondary molding cavity 16 is produced by the resin filled into the secondary molding cavity 16.

After molding, the upper clamping plate 12 is moved upward to effect opening, and at the same time, a projecting device 24 provided over both the mold and the holding device is moved upward whereby the holding body 7 and the bottle 14 are somewhat forced up, and releasing from a lower mold is effected. The bottle 14 having been subjected to secondary molding positioned in the mold is again returned to the insert position by the 180 degrees rotation of the insert mechanism. A new bottle is inserted into the mold.

INDUSTRIAL APPLICABILITY

A secondary molding machine of this invention is designed so that a mouth portion of a hollow molded product is held by a blow core and a chuck, and after clamping, internal pressure can be applied while holding the mouth portion. Therefore, the hollow molded product is not deformed due to an injection pressure, and a handle or the like can be very easily subjected to secondary molding. In addition, positioning of a hollow molded product with respect to a mold can be accurately performed by upward and downward motion resulting from a connection between an insert mechanism and an upper clamping plate. The aforesaid effects are great and very useful in industry, and the present machine is extensively utilized.

I claim:

1. A secondary injection molding machine for molding an additional piece to a previously molded hollow molded product, the secondary injection molding machine comprising:

a support member which is movable up and down and is movable also between a first and second position; a molded product holding device for holding the molded product, the holding device being mounted on the support member to be moved between the first and second positions;

a clamping mechanism adjacent to the holding device, the clamping mechanism including an upper clamping plate above the molded product and above the holding device;

a secondary injection mold mounted on the clamping mechanism, the secondary mold having a first mold cavity shaped to the shape of the previously molded hollow molded product and having a secondary molding cavity communicating with the first cavity, the secondary cavity being shaped for receiving additional molding material and for molding the additional piece on the molded product;

the clamping plate being moveable vertically upwardly for opening the cavities of the secondary mold and downwardly for closing the cavities of the secondary mold;

in the support member first position, the holding device holds the molded product out from under the clamping plate and out of the first mold cavity, and in the support member second position, the support member has moved the holding device and the molded product so that the molded product is in the first cavity;

the molded product holding device further including a blow core for communicating air into the molded product; an air blowing device positioned to be connected to the blow core when the previously molded product is in the first molding cavity for blowing air through the blow core into the molded product;

an injection device disposed on the machine and selectively moveable to communicate into the secondary molding cavity for delivering molding material to the secondary molding cavity when the holding device is holding the previously molded product and the air blowing device i delivering air through the blow core into the molded product.

2. A secondary injection molding machine for molding an additional piece to a previously molded hollow molded product, the secondary injection molding machine comprising: a rotational member, which is moveable up and down and is rotatable around an axis;

a molded product holding device for holding the molded product laterally of the axis, the holding device being mounted on the rotational member to rotate with the rotational member around the axis;

a clamping mechanism adjacent to the holding device, the clamping mechanism including an upper clamping plate above the molded product and above the holding device;

a secondary injection mold mounted on the clamping mechanism, the secondary mold having a first mold cavity shaped to the shape of the previously molded hollow molded product and having a secondary molding cavity communicating with the first cavity, the secondary cavity being shaped for receiving additional molding material and for molding the additional piece on the molded product;

the clamping plate being movable vertically upwardly for opening the cavities of the secondary mold and downwardly for closing the cavities of the secondary mold;

the rotational member having a fist rotation position where the holding device holds the molded product out from under the clamping plate and out of the first mold cavity and a second rotation position where the rotational member has moved the holding device and the molded product so that the molded product is in the first cavity;

the molded product holding device further including a blow core for communicating air into the molded product; an air blowing device positioned to be connected to the blow core when the previously molded product is in the first molding cavity for blowing air through the blow core into the molded product;

an injection device disposed on the machine and selectively moveable to communicate into the secondary molding cavity for delivering molding material to the secondary molding cavity when the holding device is holding the previously molded product and the air blowing device is delivering air through the blow core into the molded product.

3. The injection molding machine of claim 2, wherein the molded product holding device includes a chuck for securely holding the outside of the molded product at an opening into the molded product, the chuck having an opening passing through it and the blow core extending through the chuck opening, the blow core having a fore end which extends through the chuck opening and extends to the opening of the hollow molded product which is supported in the chuck.

4. The injection molding machine of claim 3, wherein the air blowing device is normally disconnected from the blow core, and the air blowing device includes means for connecting to the blow core after the clamping plate has closed the first cavity over the molded product and the chuck has closed over the molded product, and the air blowing device then communicating through the blow core to deliver air to the molded product in the first cavity.

5. The secondary injection molding machine of claim 4, wherein the air blowing device further comprises a plug at the side of the clamping mechanism, a cylinder to which the rotational member is connected for moving the plug to a position for enabling the air blowing device to contact the blow core and to permit air to blow from the air blowing device, and the blow core being spring biased against the contact with the air blowing device, such that the air blowing devices moves the blow core against the urging of the spring, thereby improving the seal with the air blowing device.

6. The secondary injection molding machine of claim 3, further comprising a column at the axis, means for rotating the rotational member around and for moving the rotational member up and down on the column, the molded product holding device being located beneath the underside of the rotational member.

7. The secondary injection molding machine of claim 2, wherein the first mold cavity has the shape of a pre-molded bottle of synthetic resin, and the secondary molding cavity has a shape for molding a handle on the bottle.

* * * * *